(12) United States Patent
Selby

(10) Patent No.: US 11,072,030 B2
(45) Date of Patent: Jul. 27, 2021

(54) AQUATIC ANIMAL DETANGLING DEVICE OF BENTHIC GEAR AND MOORING LINES

(71) Applicant: Barton G. Selby, San Carlos, CA (US)

(72) Inventor: Barton G. Selby, San Carlos, CA (US)

(*) Notice: Subject to any disclaimer, the term of this patent is extended or adjusted under 35 U.S.C. 154(b) by 0 days.

(21) Appl. No.: 16/196,418

(22) Filed: Nov. 20, 2018

(65) Prior Publication Data
US 2019/0151966 A1 May 23, 2019

Related U.S. Application Data

(60) Provisional application No. 62/588,849, filed on Nov. 20, 2017.

(51) Int. Cl.
| | | |
|---|---|---|
| B23D 15/14 | (2006.01) | |
| B26D 5/12 | (2006.01) | |
| B63B 21/00 | (2006.01) | |
| A01K 97/00 | (2006.01) | |
| F42B 3/00 | (2006.01) | |

(52) U.S. Cl.
CPC .......... B23D 15/145 (2013.01); B26D 5/12 (2013.01); *A01K 97/00* (2013.01); *B63B 2021/004* (2013.01); *F42B 3/006* (2013.01)

(58) Field of Classification Search
CPC ........ B23D 15/145; B23D 15/14; B26D 5/12; F42B 3/006; F42B 3/00; B63B 2021/004; B63B 2021/00; A01K 97/00; A01K 91/20; E02D 9/04; B24C 1/045; B63G 7/02; B63G 7/04; B63G 8/00
USPC ..... 83/639.4, 693.3, 580; 114/221 A, 221 R; 441/10
See application file for complete search history.

(56) References Cited

U.S. PATENT DOCUMENTS

| | | | | |
|---|---|---|---|---|
| 2,926,565 A | * | 3/1960 | Thorness | B64D 17/386 89/1.14 |
| 3,246,396 A | * | 4/1966 | Temple | B23D 15/145 30/277 |
| 3,262,387 A | * | 7/1966 | Reams | B63B 22/14 116/137 R |
| 3,393,605 A | * | 7/1968 | Parnell | F42B 3/006 89/1.14 |
| 3,628,205 A | * | 12/1971 | Starkey | B63B 22/003 441/25 |
| 3,640,169 A | * | 2/1972 | Rosenthal | B23D 15/145 83/639.4 |
| 3,773,009 A | * | 11/1973 | Pecksen | B63G 7/04 114/221 A |
| 3,885,484 A | * | 5/1975 | Sturgis | F42B 3/006 83/580 |

(Continued)

*Primary Examiner* — Kenneth E Peterson
*Assistant Examiner* — Nhat Chieu Q Do
(74) *Attorney, Agent, or Firm* — Mitchell Law PLLC; Matthew W. Mitchell

(57) ABSTRACT

A detangling device for severing a mooring line is disclosed. The device includes a line cutting assembly, which includes an ignition device, a propellant chamber, a moveable shuttle-knife assembly and a knife. The device further includes a pressure sensor, and a control system configured to monitor the pressure sensor and actuate the line cutting assembly when the monitored pressure sensor indicates a threshold depth is exceeded. The device can be a one-use device, wherein the knife breaks through a water-sealed housing to sever a mooring line when actuated.

9 Claims, 8 Drawing Sheets

(56) References Cited

U.S. PATENT DOCUMENTS

| | | | | | |
|---|---|---|---|---|---|
| 3,895,552 | A | * | 7/1975 | Lagofun | F42B 3/006 |
| | | | | | 83/580 |
| 4,062,112 | A | * | 12/1977 | Lake | B23D 15/145 |
| | | | | | 30/228 |
| 4,606,293 | A | * | 8/1986 | Kirkland | B63G 7/02 |
| | | | | | 114/221 A |
| 4,696,234 | A | * | 9/1987 | Kaltmann | B63G 7/04 |
| | | | | | 102/308 |
| 4,970,957 | A | * | 11/1990 | Backstein | B63G 7/02 |
| | | | | | 102/403 |
| 5,042,387 | A | * | 8/1991 | Backstein | B63G 7/02 |
| | | | | | 102/402 |
| 5,177,317 | A | * | 1/1993 | Walker | B23D 15/145 |
| | | | | | 114/221 A |
| 5,419,272 | A | * | 5/1995 | Backstein | B63G 7/04 |
| | | | | | 114/221 A |
| 5,771,833 | A | * | 6/1998 | Hasse | B63G 7/04 |
| | | | | | 114/221 A |
| 6,878,024 | B1 | * | 4/2005 | Kohuth | B63B 21/04 |
| | | | | | 114/367 |
| 9,193,422 | B1 | * | 11/2015 | Neumann | B63G 7/04 |
| 2013/0038046 | A1 | * | 2/2013 | Inuzuka | B60R 21/239 |
| | | | | | 280/743.2 |
| 2016/0207598 | A1 | * | 7/2016 | Wiggins | B23D 57/0084 |

* cited by examiner

AQUATIC ANIMAL DETANGLING DEVICE OF BENTHIC GEAR AND MOORING LINES

CROSS REFERENCE TO RELATED APPLICATIONS

This application claims the benefit of U.S. Provisional Application No. 62/588,849 filed on Nov. 20, 2018 which is hereby incorporated herein by reference.

TECHNICAL FIELD

This disclosure relates to aquatic animal detangling, and more particularly to methods and devices for detangling whales and other aquatic animals from benthic gear and mooring lines.

BACKGROUND

The statements in this section merely provide background information related to the present disclosure and may not constitute prior art.

Current known techniques for mitigating harm to whales entangled in benthic fishing gear takes three forms: (1) minor changes to fishing practices; (2) development of technology to eliminate down lines; and (3) volunteer disentanglement efforts.

As whale populations expand from conservation efforts, more and more whales are dying from entanglements in fixed (placed on the sea floor and not monitored) gear used to catch crabs, prawns or fin fish. Fishermen are responding by making minor adjustments to fishing practices such as shortening downlines and removing lost or abandoned gear. These approaches have had little success but have been adopted nonetheless, being devoid of any alternative.

Other efforts are underway to develop technologies that eliminate use of downlines. This technology is complex, heavy, expensive, requires compressed gas, moving parts, underwater communication, forces the movement to larger traps and will force consolidation and wholesale abandonment of current fishing practices, including obsoleting most of the current fleet of small boats used on the West Coast. When those systems fail in service they are very expensive to recover and will most likely be abandoned. Retrieving gear in even modest seas is difficult and dangerous, if not impractical or impossible.

The fallback position is to rely on disentanglement efforts. The current method of whale disentanglement is well intentioned, but ineffective. Most of entanglements are never seen by human observers. Most crab and trap-based fishing is done in water too remote or rough for pleasure craft. Whales move hundreds to thousands of yards between surface intervals and do so unpredictably. Pleasure boats may encounter them once a few hundred yards distant, then the second visible surface interval may be half a mile or more away. Entanglements are not often easily discerned by anyone who is not an expert. All watercraft are required by law to not approach any whale closer than 100 yards. That is often not close enough, even for an expert, to determine if a whale is entangled unless the buoys are on the viewers side of the whale, near the blowhole and at the surface.

Commercial boats actively trawling or in transit evade whales because they do not want to lose gear to whales or collide with them.

In the rare cases when entangled whales are observed, disentanglement efforts are dangerous, expensive, and unlikely. In July of 2017 a trained whale disentanglement team in Canada suffered a fatality, the US Government then ordered all domestic disentanglement teams to cease attempting to disentangle whales. Sea states having waters that whales frequent are rarely calm enough to attempt a rescue in a small boat. Winter crab season, for example, brings storms to the West Coast, and very short days.

Entangled whales are almost never close enough to a port that the small craft required for close approach can launch, locate, approach, diagnose, disentangle and return to port in one day.

Current efforts to detangle whales include cutting lines after positioning a small soft sided boat directly over the whale and sawing at the line with a knife mounted on a pole. The animals are not typically approachable until they are completely exhausted and near death, and sea states calm enough to approach are rare on the open ocean. Hence, detangle efforts are rare, often unsuccessful, and an ineffective long-term strategy.

Accordingly, a need exists for a device to safely and quickly detangle whales and other aquatic animals from benthic gear and mooring lines.

SUMMARY

A system and a device are disclosed for severing a mooring line upon detection of sensor reading changes that indicate entanglement to an aquatic animal such as a whale. The device includes a line cutting assembly, one or more pressure sensors, and a control system configured to monitor the pressure sensor and actuate the line cutting assembly based upon the monitored pressure.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIGS. 5 and 7 show a knife in a piercing state, for extension and severing of the mooring line;

FIG. 6 shows the knife in a drawn state, before selective and controlled actuation into the mooring line, all in accordance with the present disclosure.

DETAILED DESCRIPTION

Figure 1:
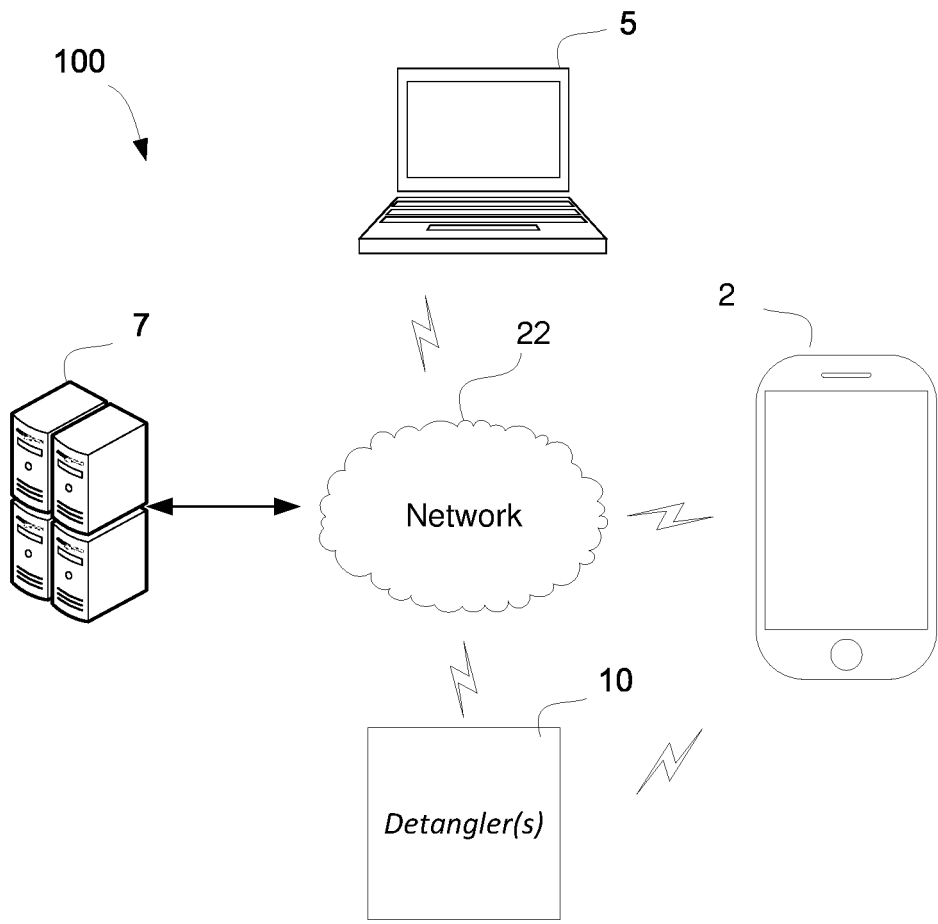
FIG. 1 schematically shows an exemplary detangling system, in accordance with the present disclosure.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used in the description herein and throughout the claims, the following terms take the meanings explicitly associated herein, unless the context clearly dictates otherwise: the meaning of "a," "an," and "the" includes plural reference, the meaning of "in" includes "in" and "on." The term "based upon" is not exclusive and allows for being based on additional factors not described, unless the context clearly dictates otherwise. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

Referring now to the drawings, wherein the depictions are for the purpose of illustrating certain exemplary embodiments only and not for the purpose of limiting the same, FIG. 1 schematically shows an exemplary detangling system 100 that may help implement the methodologies of the present disclosure. The system 100 includes a computing device 5, a server system 7, a network 22, a mobile device 2 and a detangling device 10. As shown in FIG. 1, the detangling device 10 may be communicatively connected to the mobile device 2 via the network 22 and/or directly communicatively connected to the mobile device 2. The server system 7 may be directly communicatively connected to the detangling device(s) 10 via the network 22. The mobile device 2 and the computing device 5 may be physically connected to the network 22 during selected periods of operation without departing from the teachings herein. Components of the system 100 are shown in FIG. 1 as single elements. Such illustration is for ease of description and it should be recognized that the system 100 may include, for example, multiple additional mobile device 2, computing devices 5, and detangling devices 10.

The network 22 may be any suitable series of points or nodes interconnected by communication paths. The network 22 may be interconnected with other networks and contain sub networks network such as, for example, a publicly accessible distributed network like the Internet or other telecommunications networks (e.g., intranets, virtual nets, overlay networks and the like). The network 22 may facilitates the exchange of data between and among the mobile device 2, the computing device 5, and the server system 7 although in various embodiments the mobile device 2 may be directly connected to the detangling device 10, such as during an initial set up or a maintenance event, for example.

The computing device 5 and the server system 7 may each be: various embodiments of a computer including high-speed microcomputers, minicomputers, mainframes, and/or data storage devices. The server system 7 preferably executes database functions including storing and maintaining a database and processes requests from the mobile device 2 and the computing device 5 to extract data from, or update, a database as described herein below. The server 7 may additionally provide processing functions for the mobile device 2 and the computing device 5 as will become apparent to those skilled in the art upon a careful reading of the teachings herein.

In addition, the mobile device 2 may include one or more applications that the user may operate. Operation may include downloading, installing, turning on, unlocking, activating, or otherwise using the application. The application may comprise at least one of an algorithm, software, computer code, and/or the like, for example, mobile application software. In the alternative, the application may be a website accessible through the world wide web. In one embodiment, the programs may be used to remove stored data from operation, and report on energy usage and condition of the device 10.

Figure 2:
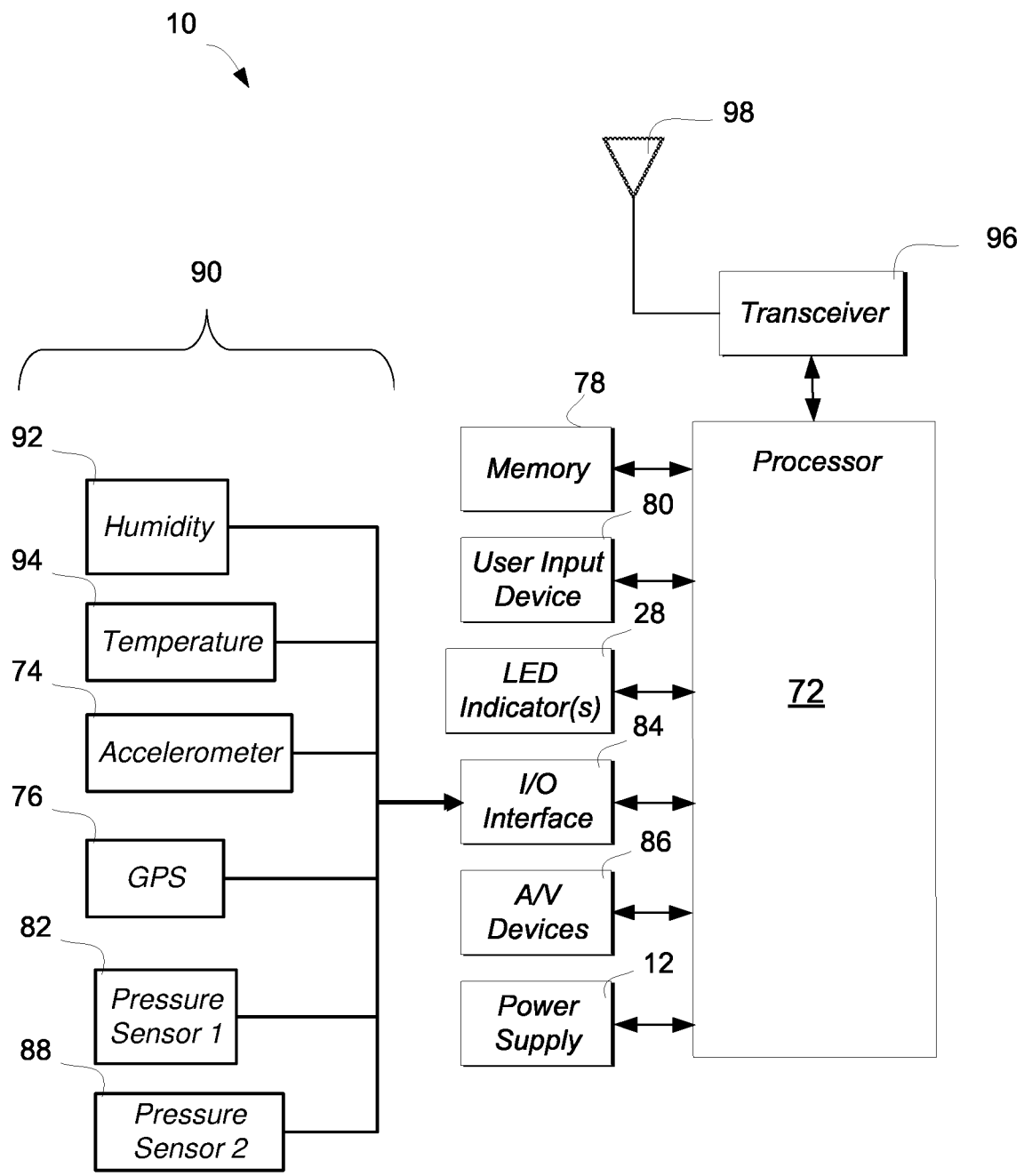
FIG. 2 schematically shows an exemplary embodiment of the detangling device, in accordance with the present disclosure.

FIG. 2 schematically shows an exemplary embodiment of the detangling device 10. As shown in FIG. 2, the device 10 includes a processor module 72. The device 10 may additionally include any digital and/or analog circuit elements, comprising discrete and/or solid state components, suitable for use with the embodiments disclosed herein. One skilled in the art will recognize upon a careful reading of the teachings herein that a radio processor may be included in another embodiment of the device 10. In one embodiment, a communication adapter and/or transceiver is utilized for wireless communication over one or more wireless communications channels. Although various components are shown as separate components, such an illustration is for ease of description and it should be recognized that the functions performed by the various components may be combined on one or more components.

A control system, which may be the processor module 72, may be configured to execute various computer programs (e.g., software, firmware, or other code) such as application programs and system programs to provide computing and processing operations for the device 10. In various embodiments, processor module 72 may be implemented as a host central processing unit ("CPU") using any suitable processor or logic device, such as a general purpose processor, or other processing device in alternative embodiments configured to provide processing or computing resources to device 10. For example, processor module 72 may be responsible for executing various computer programs such as application programs and system programs to provide computing and processing operations for device 10. The application software may provide a graphical user interface ("GUI") to communicate information between device 10 and a user. The computer programs may be stored as firmware on a memory associated with processor 72, may be loaded by a manufacturer during a process of manufacturing device 10, and may be updated from time to time with new versions or software updates via wired or wireless communication.

System programs assist in the running of a computer system. System programs may be directly responsible for controlling, integrating, and managing the individual hardware components of the computer system. Examples of system programs may include, for example, an operating system, a kernel, device drivers, programming tools, utility programs, software libraries, an application programming interface ("API"), a GUI, and so forth.

The memory module 78 is preferably coupled to the processor module 72. In various embodiments, the memory module 78 may be configured to store one or more computer programs to be executed by the processor module 72. The memory module 78 may be implemented using any machine-readable or computer-readable media capable of storing data such as volatile memory or non-volatile memory, removable or non-removable memory, erasable or non-erasable memory, writeable or re-writeable memory, and so forth. Although the memory module 78 is shown as being separate from the processor module 72 for purposes of illustration, in various embodiments some portion or the entire memory module 78 may be included on the same integrated circuit as the processor module 72. Alternatively, some portion or the entire memory module 78 may be disposed on an integrated circuit or other medium (e.g., solid state drive) external to the integrated circuit of the processor module 72.

In one embodiment, a user input device 80 may be coupled to the processor module 72. The user input device 80 may include, for example, an alphanumeric, numeric key layout and an integrated number dial pad. The device 10 also may include various keys, buttons, and switches such as, for example, input keys, preset and programmable hot keys, left and right action buttons, a navigation button such as a multidirectional navigation button, power/end buttons, preset and programmable shortcut buttons, a volume rocker switch, a ringer on/off switch having a vibrate mode, a keypad and so forth. In one embodiment, the device 10 simply includes an ON and an OFF button, the other controls being activated through a wirelessly connected computing device, such as the mobile device 2.

The processor module 72 may be coupled to one or more light-emitting diodes (LEDs) 28. In one embodiment, a first LED of the one or more LEDs is used to indicate a first status. In one embodiment, a second LED is used to indicate a second status. In one embodiment, the first status is associated with a green color and the second status is associated with a red color. In one embodiment, a third LED may be used to associate with a third status, e.g., a yellow color. Statuses may predefined.

An I/O interface 84 is preferably coupled to the processor module 72. The I/O interface 84 may include one or more I/O devices such as a serial connection port, an infrared port, Blue Tooth Low Energy (BLE), Mesh Networks, wireless capability, and/or integrated 802.11x (WiFi) wireless capability, to enable wired (e.g., USB cable) and/or wireless connection to a local or networked computer system, such as the mobile device 2, and/or the server 7.

In one embodiment, the device 10 includes an audio/video ("A/V") module 86 coupled to the processor module 72 for communicatively connecting and communicating therebetween to various audio/video devices. The A/V module 86 may be configured to support A/V capability of the device 10 including components such as, a microphone, one or more speakers, an audio port to connect an audio headset, an audio coder/decoder (codec), an audio player, a video codec, a video player, and so forth. The A/V input module 86 may include an imaging module configured to capture digital images. The imagining module may include an optical sensor, e.g., a charged coupled device (CCD) or a complementary metal-oxide semiconductor (CMOS) optical sensor to facilitate camera functions, such as recording photographs and video clips. The image frames may be processed by the memory 78.

A power supply 12 configured to supply and manage power to components of device 10 is preferably coupled to the processor module 72. In various exemplary embodiments, the power supply 12 may be implemented by a rechargeable battery, such as a removable and rechargeable lithium ion battery to provide direct current ("DC") power, and/or an alternating current ("AC") adapter to draw power from a standard AC main power supply. In one embodiment, a generator may be included therein to recharge the batter, e.g., a wave-based generator or a gas generator, for example.

The device 10 may include one or more transceivers 96 coupled to the processor 72 and an antenna 98, each transceiver may be configured to communicate using different types of protocol, e.g., Bluetooth®, Near Field Communications, Mesh network, etc., communication ranges, operating power requirements, RF sub-bands, information types (e.g., voice or data), use scenarios, applications, and so forth. For example, the transceiver 96 may include a Wi-Fi transceiver and a cellular or WAN transceiver configured to operate simultaneously. In various embodiments, the transceiver is alternated for a transmitter and/or receiver.

In one embodiment, the device 10 includes a plurality of sensors 90. The sensors may be directly coupled to the processor 72 or connected through one or more other modules including, e.g., the I/O interface, such as shown in FIG. 2. In one embodiment, a humidity sensor 92 is included. In one embodiment, a temperature sensor 94 is included. In one embodiment, the temperature sensor, is an infrared reader. In one embodiment, an accelerometer 74 is included. The accelerometer 74 may be a three-axis accelerometer.

Figure 3:
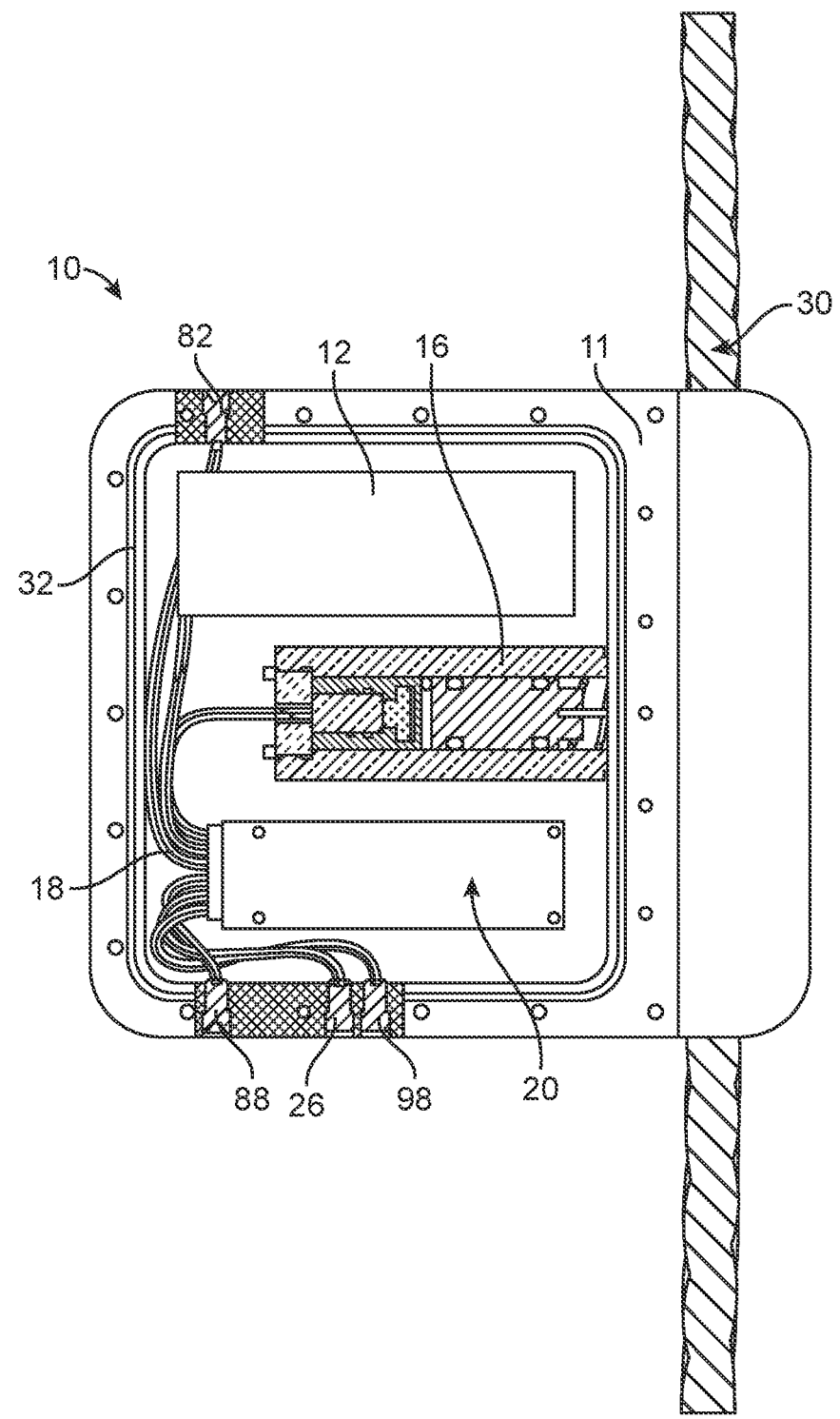
FIG. 3 is a cross-sectional view of an exemplary aquatic animal detangling device, in accordance with the present disclosure.
Figure 4:
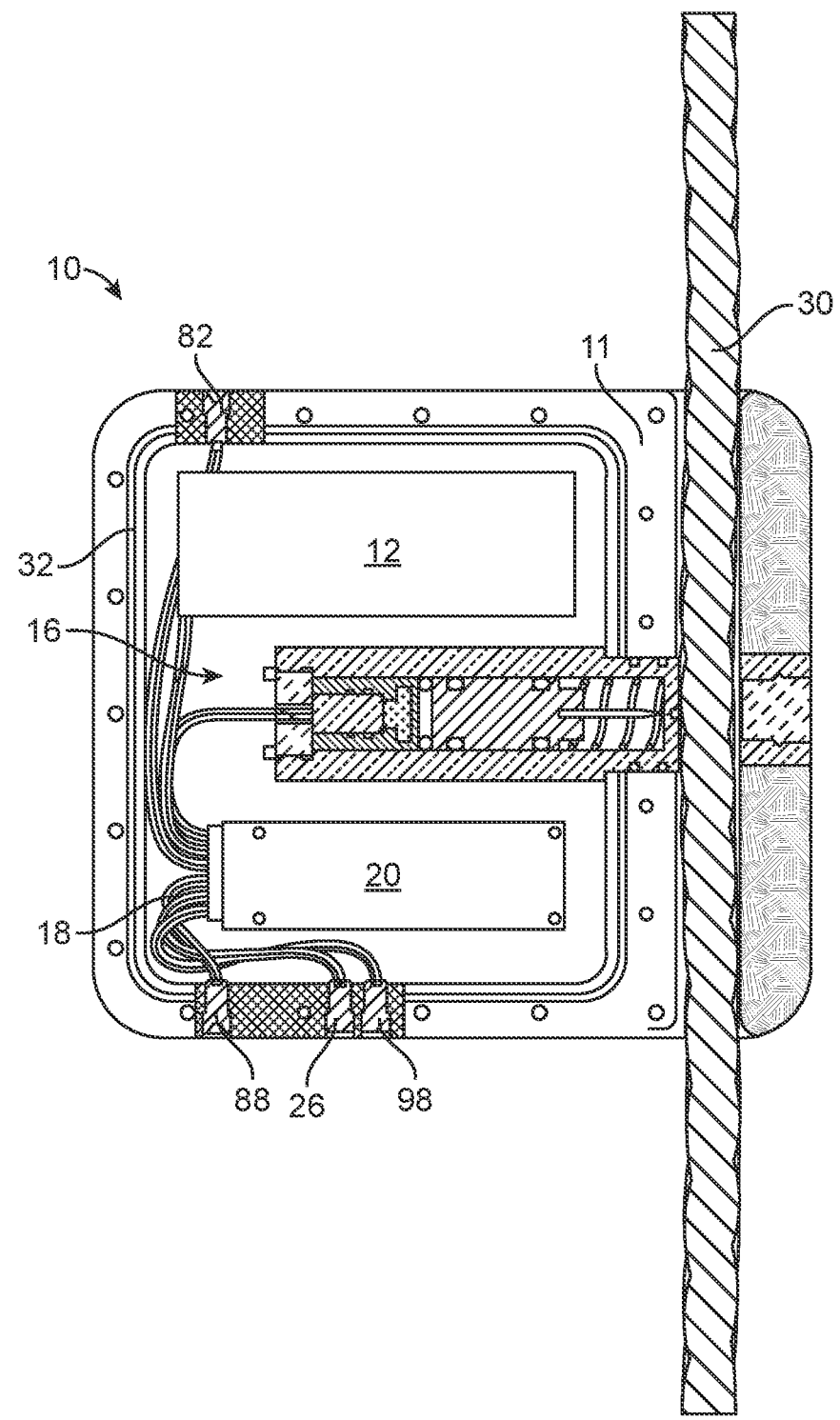
FIG. 4 is another cross-sectional view of an exemplary aquatic animal detangling device with a housing removed to show coupling to the mooring line, in accordance with the present disclosure.

FIGS. 3 and 4 are partial cross-sectional views of the exemplary device 10, illustrated without a housing cover to show components therein. FIG. 3 shows the line 30 covered, while FIG. 4 shows the line 30 uncovered. As FIGS. 3 and 4 show, the detangling device 10 includes a housing 11 configured to contain operating components of the device. In one embodiment, the housing 11 is water proof. The housing 11 may include a cover removeable via mechanical fasteners. In one embodiment, the housing 11 includes a sealing liner 32 sized and positioned to engage the cover to make a water proof seal when the cover is attached. The liner 32 may be formed of an impermeable material such as various silicon-based materials.

Inside the housing 11 is the power supply 12, a printed-circuit logic board 20 containing various components illustrated in FIG. 2, a line cutter assembly 16, two pressure sensors 82 and 88, a status indicating LED assembly 28 including a window enabling external viewing in one embodiment, a wiring harness 18 connecting the components and the antenna 98. The logic board 20 may contain: various microprocessors, an on-board battery, memory for data storage, a clock, accelerometers 74, humidity and temperature sensors 92 and 94 to monitor condition of the device and a discharge circuit that energizes the line cutter assembly 16. In one embodiment, a strain gage may be incorporated to an exterior of the housing 11. The strain gage is preferably wireless communicatively connected to the logic board 20.

The line cutter assembly 16 may be integral with the housing 11 or may be mounted within the housing 11 using fasteners or threads and by extending into a hole bored in a wall of the housing 11 open to the sea. The line cutter assembly 16 is preferably isolated from ambient water pressure in place so that water does not leak into the housing 11. The line cutter 16 is preferably contained inside a sealed package such that fingers can't be inserted into the cutting region. The cutter is preferably captive, with no exit from the device.

Figure 5:
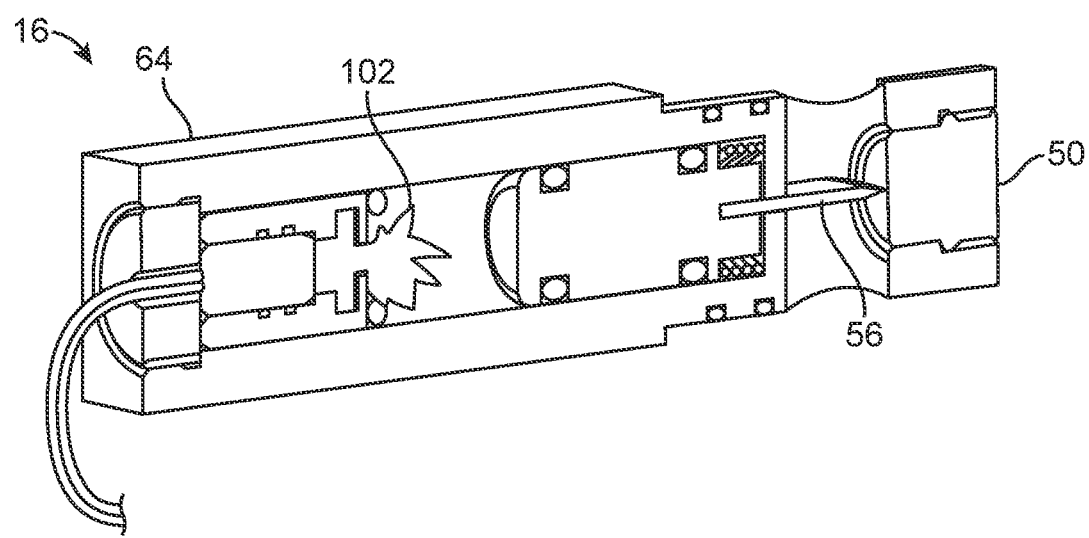
FIGS. 5-7 are cross-sectional views illustrating an exemplary line cutter assembly.
Figure 6:
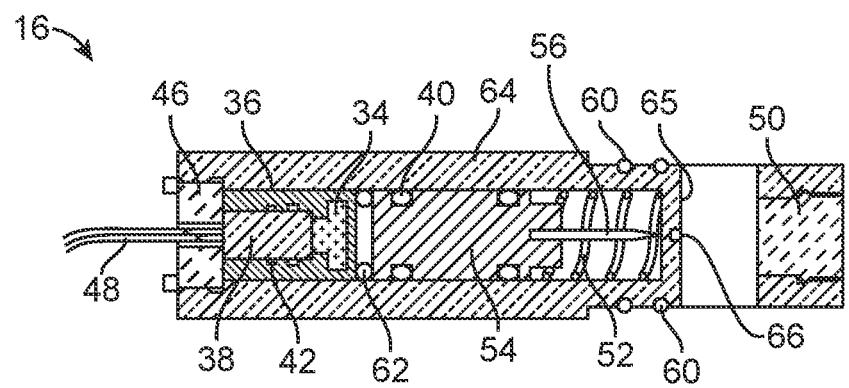
Figure 7:
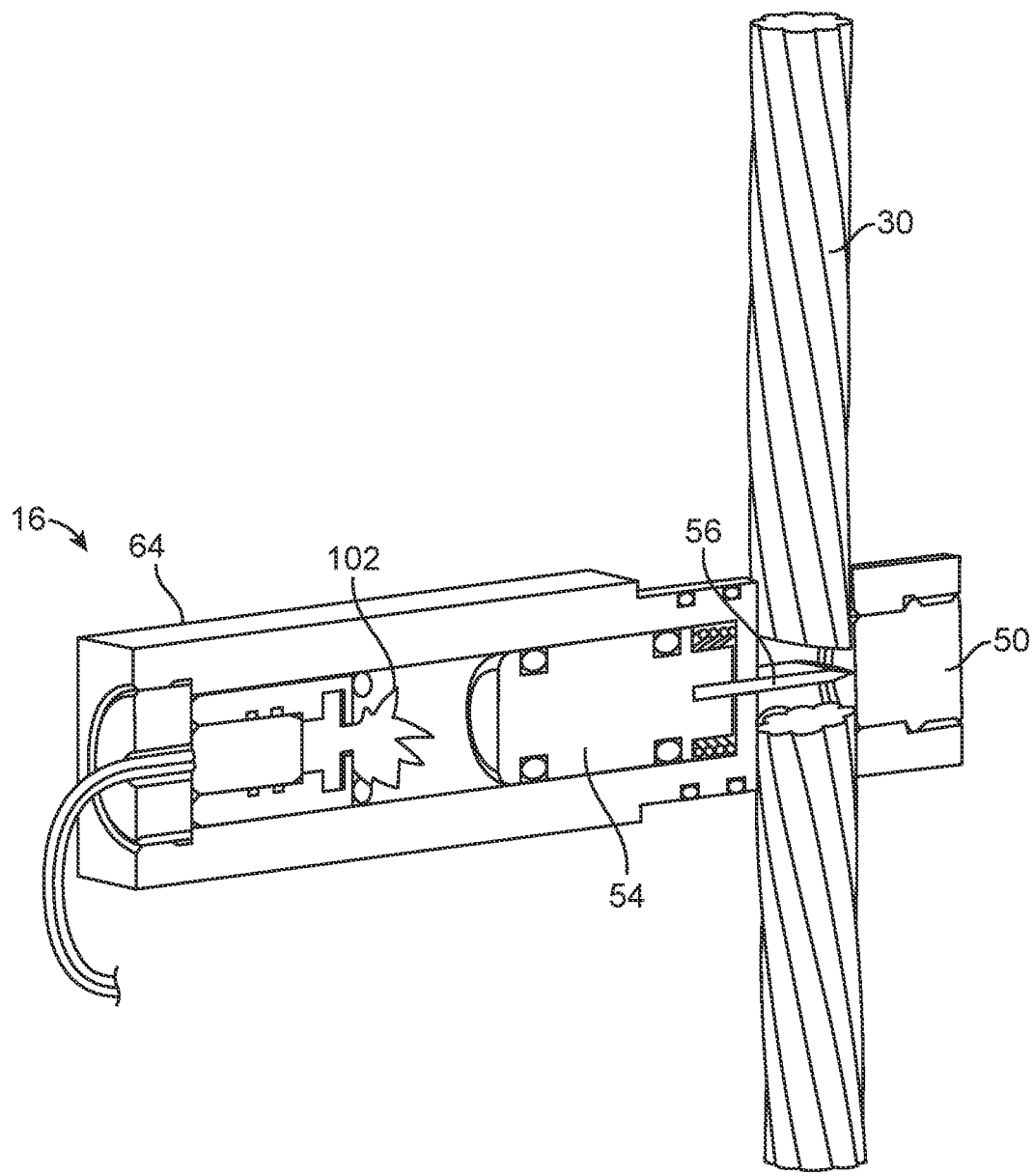

FIGS. 5-7 show an exemplary line cutter assembly 16 in cross-section to illustrate components therein. FIGS. 5 and 7 show a knife 56 in a piercing state, for extension and severing of the line 30. FIG. 6 shows the knife 56 in a drawn state, before selective and controlled actuation into a line.

As FIGS. 5-7 show, a housing 64 may contain various components of the assembly 16. The housing 64 may be formed of most any rigid material such as metal or plastic. In one embodiment, the housing 64 is roughly 1.25 square inches in cross section and roughly five (5) inches in length, but can be larger or smaller depending on the particular heft or size of the mooring line attached thereto. The housing 11 can have holes roughly 0.75 inches in diameter on the same long axis for engaging the assembly 16 to the line 30. In the exemplary embodiment, two (2) inches of the housing 64 are round and externally grooved to receive o-rings 60. This round section extends through a hole in the housing 11 into an opening that the gear downline 30 is routed through. In one embodiment, the wet side of the cutter housing 64 also has a hole perpendicular to its long axis matching the hole the down line 30 is routed through. The housing 64 seals the dry or active components from the sea and positions the line cutter assembly 16 perpendicular to the line 30.

In one embodiment, the cutter assembly 16 has a square-shaped cross section, but a circular-shaped interior cross-section. Within the interior space, which is placed within the housing 11 of the device 10, it is dry. A wall 65 separates the interior space of the cutter assembly 16 from the water and the line 30. The dry side of the line cutter housing is bored or molded round along it's long axis centerline with a terminus carefully dimensioned to control the wall thickness as it will see ambient ocean pressure. In one embodiment, the wall 65 includes a thinned portion 66 adjacent to the knife 56. The thinned portion of the wall 65 may be bored, milled, or otherwise formed to make piercing of the wall 65 easier by the knife, when actuated. The thinned portion 66 must be durable enough to keep water pressure from breaking in the cutter assembly 16, while the knife 56 is in the drawn, unactuated state. The cutter assembly 16 preferably includes a threaded anvil-plug 50. Walls may be threaded to receive the threaded anvil-plug 50.

The cutter assembly 16 preferably includes a gas generator 36, a fuel chamber 34, and an electrical initiator 38 configured to selectively execute an ignition or firing event 102. In one embodiment, the cutter assembly 16 uses a squib or initiator along with a charge instead of the gas generator 36. The gas generator 36 is, in one embodiment, a sealed cylindrical vessel containing pyrotechnic propellant in a chamber 34. The initiator 38 is sealed by an o-ring 42 and held in place by a threaded plug 46 with a through hole for the electrical leads 48. Leads 48 are connected to the logic board 20 via the wiring harness 18, which also connects the two pressure sensors 82 and 88, the power supply 12, the RF antenna 98 and the indicating LEDs 28. The leads 48 are, preferably sealable threaded through a plug 46 and connected to the initiator 38, which may be a spark plug or other ignitor device. Various o-rings may be placed around the initiator to seal combustion gases within the bore of the cutter thus directing pressure towards the shuttle-knife assembly.

An O-ring 62 is placed between the shuttle-knife assembly 54 and the gas generator 36 to cushion the gas generator 36 from contact with the shuttle 54 prior to the ignition event, i.e., to prevent chaffing from vibrations or drops during use and transport. The shuttle-knife assembly 54 includes an o-rings 40 held in grooves placed near the ends of the piston. In one embodiment, the shuttle-knife assembly 54 is biased by the spring 52. The knife 56 is held in a slot in the shuttle 54. A spring 52 biases the shuttle-knife assembly 54, which is free to move horizontally in the bore, against the gas generator 36.

The spring 52 has three functions: (1) the spring 52 helps guide the knife 56 and ensure it is properly oriented in rotation to penetrate the thinned portion 66 to cut the line 30; (2) preventing wear or inadvertent piercing of the thinned portion 66; and (3) to set the volume of space the generator fires into and allow it to have the proper acceleration prior to cutting the wall and the line. In one embodiment, the spring 52, has an oversized loop at the distal end to align it in the interior radially, and at the shuttle end an undersized loop to allow the shuttle to be properly oriented (radially) in the bore to cut the line 30. Having a proper acceleration prior to cutting the wall and the line also involves configuring the mass of the shuttle, the volume of the chamber, as well spring pressure affects how the shuttle 54 starts to move and how much energy it carries into the cutting application. It is stopped by the anvil and by the wall at the bottom of the bore. This may also be done with a shear pin through the wall of the line cutter and the shuttle in between the two o-rings.

In some deepwater applications it may not be prudent to drive a knife through a thick housing, which is required to counter water pressure. In those instances, the cutter assembly 16 would be an actuator pushing out a pin that two loops of line circle, one line headed to the trap, one line to the surface. The pin would be sealed in the housing with an o-ring and prevented from dropping out the other side by a shear pin. The pin would be inline with cutter, it would be pushed out by a plunger which would replace the knife.

Figure 8:
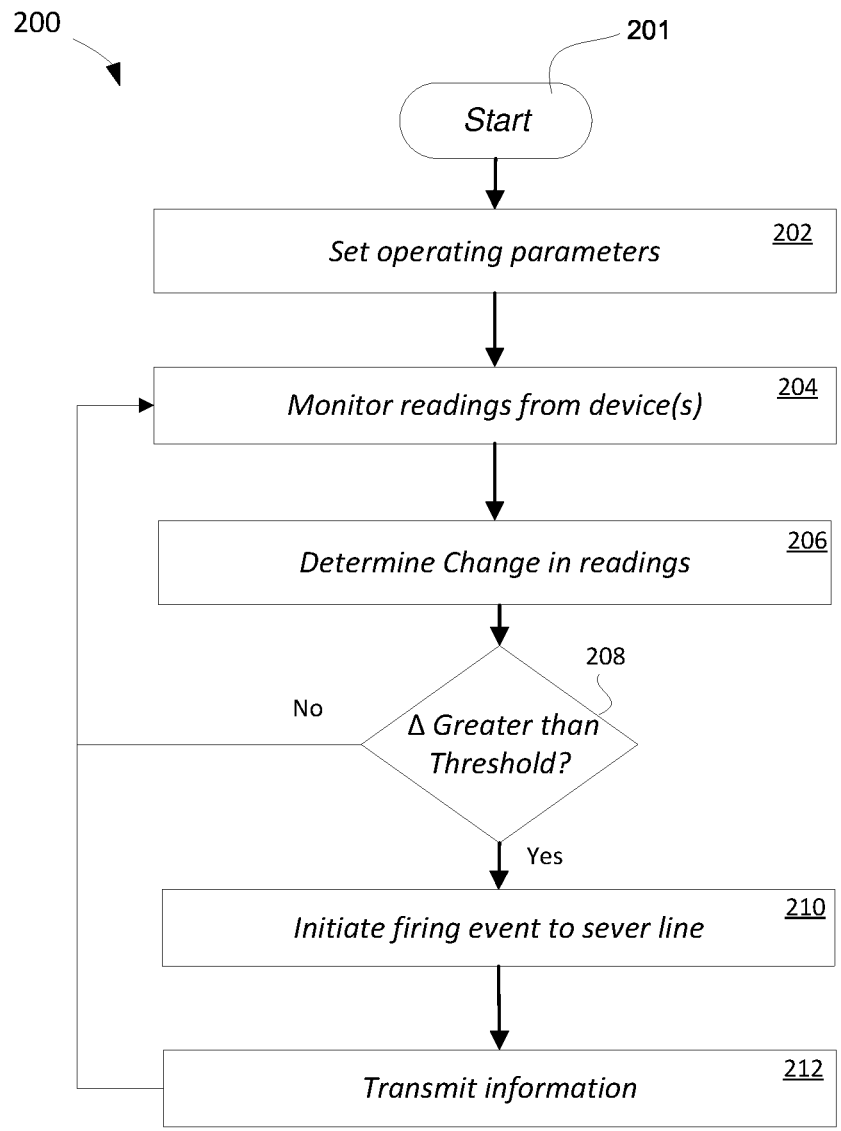
FIG. 8 shows an exemplary process for severing a mooring line using the detangling device, in accordance with the present disclosure.

FIG. 8 shows a process 200 for detangling an aquatic animal from benthic gear and mooring lines. As FIG. 8 shows, the process 200 is initiated at step 201 by transitioning a device to an ON operating state. Alternatively, the device 10 may be configured to transition to an operating state based upon monitored readings from one or more of the sensors 90. For example, the device 10 may be in a DORMANT operating state until a pressure sensor reading reaches a predefined threshold and/or an accelerator indicates movement greater than a predefined threshold, and/or GPS reading indicates movement greater than a predefined threshold. After exceeding a predefined threshold associated with one of the sensors 90, the device 10 may then transition to the ON operating state.

In any particular application, one or more of the devices 10 may be utilized. Some mooring line or benthic gear deployments may only require a single device 10, other deployments may need a plurality of devices 10. For example, in one exemplary operation, a first device 10 can be incorporated into the downline float surface and a second device 10 can be incorporated on the trap or gear terminus at the sea floor benthic, i.e., one or both ends of the line. As shown in FIG. 4, the device 10 is attached to a line 30. The float lines, i.e., the down line and the trailing float line, pass through the body of either the first or second device 10, which contains each contain a sensing and a line cutting mechanism e.g., the cutter assembly 16. Additional devices can be attached to the down line at various depths to cut the line into smaller pieces as desired or required.

Typically, whales or other aquatic animals become entangled when they contact the down line, i.e., the line that connects the surface float to the pot or traps, as they swim past the gear. The animals are not capable of seeing lines, nor understanding they are not kelp. The line can wrap around their pectoral fins, their flukes, their head and or mouth or a combination of those body parts.

Tying a knot requires force or friction at both ends of a line, in an entanglement the floats often provide that friction on one end, getting lodged between the body and flukes or pectorals, or binding on wraps of line. While will often react to entanglement by rolling, which, further complicates the problem with more and more wraps of line. The force on the other end of the line is provided by the benthic gear, in the form of weight and/or friction as it is dragged by a swimming whale.

At step 202, an administrator-user may specify operating parameters of the device 10. Operating parameters may include depth, heuristics necessary for a triggering event, etc. These parameters may be selected from a plurality of predefined profiles that may be associated with location, season, depth or aquatic animal. These parameters may be set for each device 10 or may be set for a system 100.

At step 204, the system 100 monitors readings from the device(s) 10. These readings may be pressure readings and/or accelerometer readings. In one embodiment, GPS-based information pertaining to location movements may be used. The sensing components in the devices 10 monitors the parameters specified by fisheries, which can be depth in the water column, and time. Further embodiment may also sense speed and acceleration. Some embodiments can also sense location via GPS 76, the water temperature, time of immersion and other variables that fisheries managers choose to monitor.

At step 206, the device 10 determines a change in monitored readings over a predefined time period. In one embodiment, a time period is a minute. In various embodiments, a baseline measurement may be established for comparison to a current reading. For example, a pressure reading may be defined as an average over an initial time period or a pressure reading may be set once the accelerometer, or GPS reading, indicates that the device 10 is established at a set position.

At step 208, the device 10 determines whether the change in readings is outside a predefined threshold. If pressure readings are being used, the threshold requirement may be a pressure indicating a rise or fall of a certain depth, the depth being greater than would normally be felt by normal wave or weather changes. If the accelerometer readings are being used, the threshold may be set at a movement that is greater than would normally be felt by normal wave or weather changes. Likewise, if GPS readings are being used, the locational difference threshold may be greater than would normally be felt by normal wave or weather changes. In various embodiments, a plurality of thresholds may be required to be exceeded before a firing event is initiated. If a threshold is not exceeded, the device 10 continues to monitor readings from a device 10.

In various embodiments, the device 10 employs a safety system utilizing the two sensors measuring water pressure. The line 30 cannot be severed unless a predefined minimum pressure is detected, e.g., the line cannot be severed unless both sensors indicate a change of at least thirty feet, or any predefined depth.

At step 210, the device 10 initiates a firing event. This firing event may be initiated when a plurality of thresholds are determined to be exceeding a threshold. For example, a pressure reading from the first sensor 82 and the second sensor 88 may be determined to both exceed a threshold indicating a change in depth. In another embodiment, both sensors 82 and 88 along with a reading from the accelerometer 74 are required to exceed the thresholds before the firing event is initiated. The firing event sends electrical power to the initiator 38 which produces a flame that ignites the propellant 34, generating pressure and propelling the shuttle-knife assembly 54 forward with sufficient force to drive the knife 56 through the window or thinned portion 66 and cut the downline 30.

At step 212, the device 10 transmits information to the system 100. This information can include information pertaining to the firing event. In various embodiments, information from the sensors 90 can be transmitted periodically, upon occurrence of a predefined event or upon request by a user. In various embodiments, the device 10 will store data for its entire working life, the data can be downloaded wirelessly by administrator-users or the device 10 can be retrieved for download.

In one embodiment, the surface device, using profiles or parameters programmed and specified by fisheries or the administrator-user of the device(s) 10, will sever the floats from the line very early in an entanglement, first at the float, to encourage the weight and drag of the trap to pull the line off the animal. Depending on fisheries specified parameters the benthic monitor will sever the line based on movement and depth parameters. The release profiles of the devices may be programmed for the specific types of whales anticipated at a particular time and/or location, their position on the gear surface, mid-line and benthic and local conditions.

In normal operation the device 10 will initially experience a pressure-time relationship that indicates it has been dropped into the sea, as it sinks predictably at a uniform rate to the bottom. Once on the bottom the pressure will reflect only slight periodic rises and falls from ocean swell. The uphaul event is a minute or two in duration with a generally uninterrupted and very predictable rise time at a near constant upward and forward speed. In an entanglement the device 10 will be dragged along the sea floor then rise or fall unpredictably, but it will stay in motion as the whale moves. Normal operation motion is limited to the fall to the sea floor and the brief uphaul event, once motion continues for more than a specified few minutes, and or the device rises and falls it is an entanglement.

In normal operation the floats remain on the surface, even in heavy breaking waves. If they are submerged it is for very brief periods of time and very shallow depths. Large breaking waves are typically seen only in very shallow water close to shore. Even breaking waves will not submerge floats for more than a few seconds and to relatively shallow depths, and do so with a very predictable depth vs time profile. Floats are tethered to the pot and currents don't rapidly reverse.

When a whale becomes entangled in gear, it will quickly move the float beyond its tether circle, at speeds not normally seen by floats. Most importantly, the whale will dive to try and clear the entanglement and the float will quickly be taken to a depth that is easily distinguished by pressure sensors from normal sea states.

The system 100 and/or individual devices 10 monitor the float and or pot, and when movement profiles indicate an event that is not an uphaul or deployment they sever the lines at the pot or float. It can also sever the lines after a predefined soaking period, regardless of movement or depth change, e.g., 21 days, indicating the gear is abandoned.

In various embodiments, in storage, the device 10, to save battery power, monitors depth and motion on a schedule designed to conserve battery life. When in motion that interval will decrease, once a pressure reading indicates it is under water the interval is greatly decreased.

In various embodiments, the pressure sensors 82 and 88 can be either strain gages mounted to an internal surface of the housing or transducers mounted through the housing.

Neither the benthic or the surface profile enable line cutting unless underwater, so there is no danger to deckhands when gear is suspended by the line out of the water. Both profiles will cut the line before reaching crush depth if the device approaches its service depth for any reason.

In one exemplary application, the benthic system is mounted on the crab pot or other gear or above a three or four line lifting tether on the downline just above the pot. The float device is mounted inside the float. Once the device has determined the pot is not being retrieved, at the timing and profile specified by fisheries management it cuts the line 30. It may wait for a specified amount of time to allow the weight and drag of the pot to pull the line off the animal once the surface floats have been cut, or cut it immediately.

In various embodiments, the device 10 is serialized and boldly marked with the last date it can be operated without service. It is designed to have a multiple year life, as specified by customer request, governed largely by battery size. It has a window with an illuminated green LED indicating it has at least one month of battery life remaining, and when low battery voltage or faults are present it will illuminate a red LED indicating it should be replaced. It also has an RF ID serial tag that can be read remotely. In some embodiments the operating parameters and battery condition can be updated without opening the device, and data can be gathered in the same operation.

The schematic flow chart diagrams included herein are generally set forth as logical flow chart diagrams. As such, the depicted order and labeled steps are indicative of one embodiment of the presented process. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the process. For example, an arrow may indicate a waiting or monitoring period of unspecified duration between enumerated steps of the depicted process. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Additionally, the order in which a particular method occurs may or may not strictly adhere to the order of the corresponding steps shown. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. For example, steps 202, 204, 206, 208 and 212 may be executed concurrently in some embodiments.

Additionally, examples in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As will be appreciated by one skilled in the art, aspects of the present invention may be embodied as a system, method, and/or computer program product. Accordingly, aspects of the present invention may take the form of an entirely hardware embodiment, an entirely software embodiment including firmware, resident software, micro-code, etc. or an embodiment combining software and hardware aspects that may all generally be referred to herein as a "circuit," "module," or "system." Furthermore, aspects of the present invention may take the form of a computer program product embodied in one or more computer readable mediums having program code embodied thereon.

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory RAM, a read-only memory ROM, an erasable programmable read-only memory EPROM or Flash memory, a portable compact disc read-only memory CD-ROM, a digital versatile disc DVD, an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency RF, or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network LAN or a wide area network WAN, or the connection may be made to an external computer for example, through the Internet using an Internet Service Provider.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A detangling device for severing a mooring line, the device comprising:
   a line cutting assembly comprising: an ignition device, a propellant chamber, a moveable shuttle-knife assembly and a knife;
   a pressure sensor; and
   a second pressure sensor;
   a control system configured to monitor the pressure sensor and actuate the line cutting assembly when the monitored pressure sensor indicates a threshold depth is exceeded, wherein the control system is further configured to monitor the second pressure sensor, and
   wherein the control system includes one or more processors configured to perform:
      receiving operating parameters;
      monitoring input from the pressure sensor and the second pressure sensor; and
      actuating the line cutting assembly to sever the mooring line based upon the monitored input from the pressure sensor and the second pressure sensor.

2. The detangling device of claim 1, wherein the line cutting assembly further comprises:
   a sealed cylindrical interior, housing the ignition device, the propellant chamber, the moveable shuttle-knife assembly, and the knife, and wherein the sealed cylindrical interior includes a circular-shaped wall having a thinned portion aligned with the knife.

3. The detangling device of claim 2, wherein the thinned portion has a lesser wall thickness than most of the circular-shaped wall.

4. The detangling device of claim 1, further comprising:
   a water sealed housing for containing the line cutting assembly, the pressure sensor, and the control system; and
   wherein the line cutting assembly is sealably connected to the water sealed housing via one or more o-rings.

5. The detangling device of claim 4, wherein the line cutting assembly is perpendicular to an opening configured to receive the mooring line.

6. A detangling device for severing a mooring line, the device comprising:
   a line cutting assembly;
   a first and a second pressure sensors;
   a water sealed housing for containing the line cutting assembly, and the pressure sensor, wherein the line cutting assembly is sealably connected to the water sealed housing via one or more o-rings at a perpendicular angle to an opening configured to receive the mooring line, wherein the perpendicular angle is relative between the line cutting assembly and the opening; and
   a control system, contained within the water sealed housing, configured to monitor the first and second pressure sensors and actuate the line cutting assembly based upon monitored input therefrom, wherein the control system includes one or more processors configured to perform:
      receiving operating parameters;
      monitoring input from the first and second pressure sensors; and
      actuating the line cutting assembly to sever the mooring line based upon the monitored input from the first and second pressure sensors and an accelerometer.

7. The detangling device of claim 6, wherein the control system is communicatively connected to a computing device; and wherein the one or more processors are further configured to perform:
   receiving instructions from the computing device to sever the mooring line; and
   actuating the line cutting assembly to sever the mooring line based upon the received instructions.

8. The detangling device of claim 7, wherein the line cutting assembly further comprises:
   a sealed cylindrical interior, housing an ignition device, a propellant chamber, a moveable shuttle-knife assembly, and a knife, and wherein the sealed cylindrical interior includes a circular-shaped wall having a thinned portion aligned with the knife, wherein the thinned portion has a lesser wall thickness than most of the circular-shaped wall.

9. The detangling device of claim 8, wherein the one or more processors are further configured to perform:
   receiving instructions from the computing device to transmit information from the first and second pressure sensors; and transmitting information from the first and second pressure sensors to the computing device.

* * * * *